June 30, 1964  G. C. SULLIVAN ETAL  3,139,369
APPARATUS FOR MAKING LAMINATED BUILDING
PANELS OF CELLULAR STRUCTURE
Filed Aug. 3, 1960  4 Sheets-Sheet 3
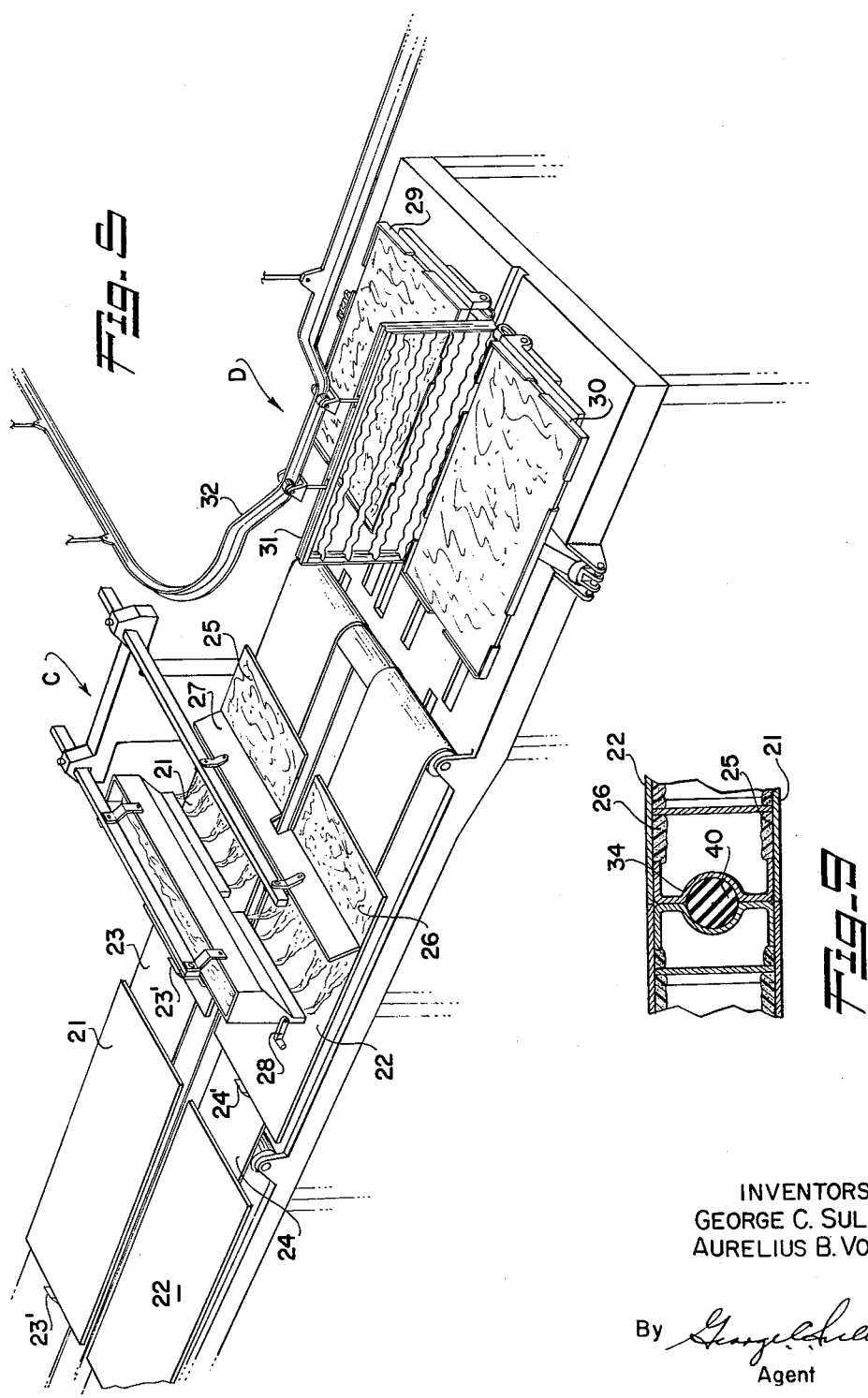
INVENTORS
GEORGE C. SULLIVAN
AURELIUS B. VOSSELLER
By *George C. Sullivan*
Agent

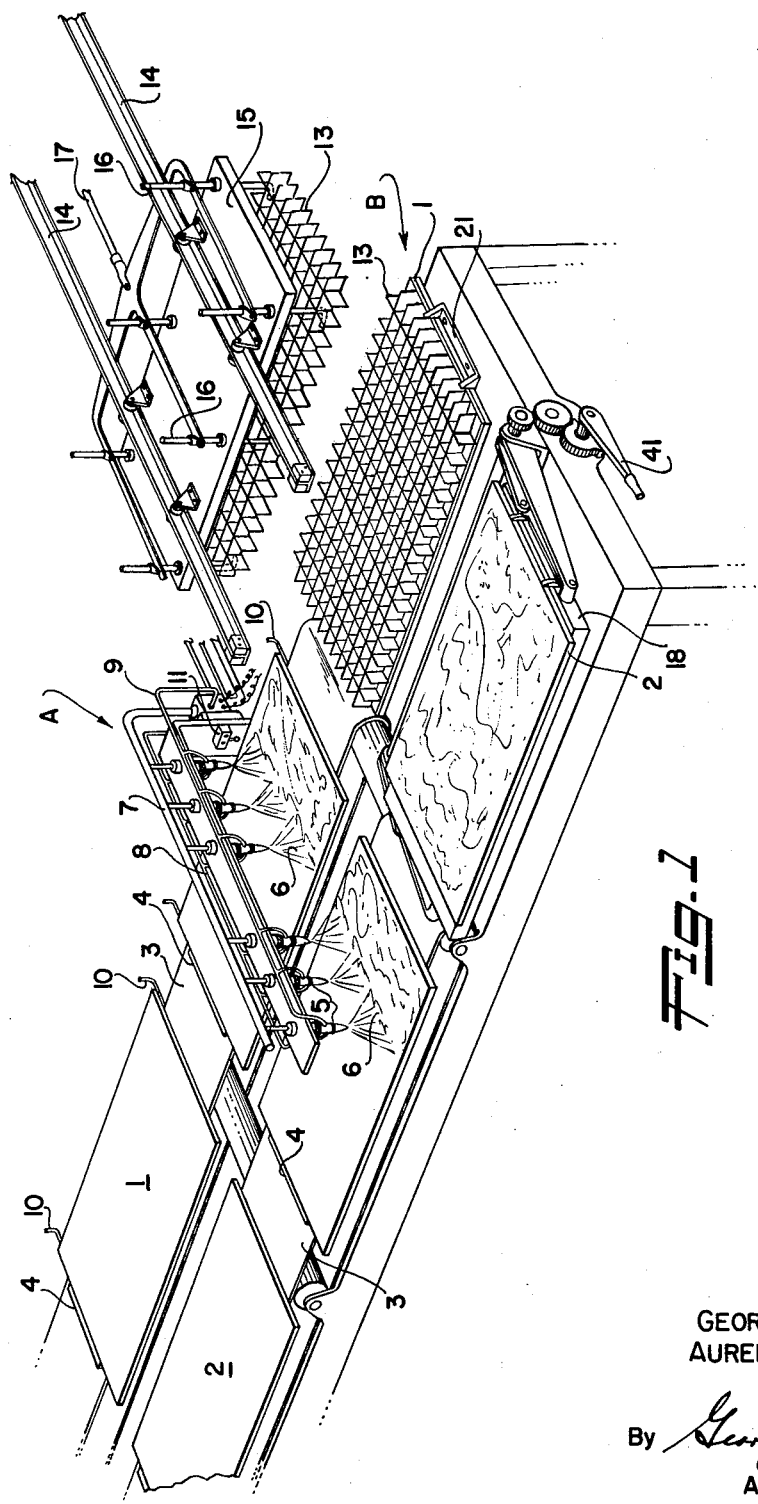

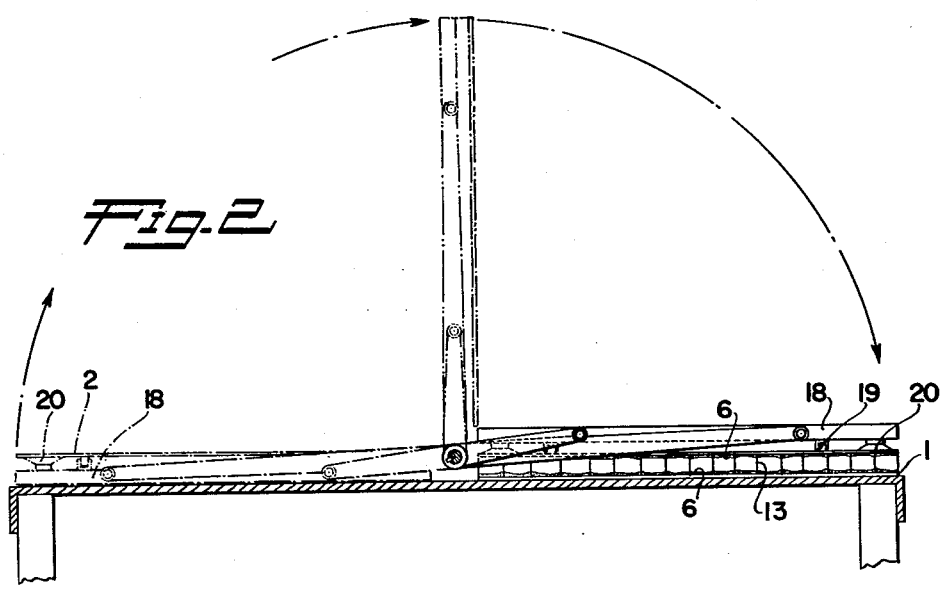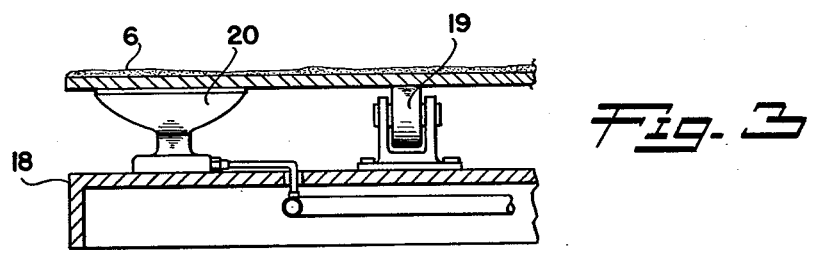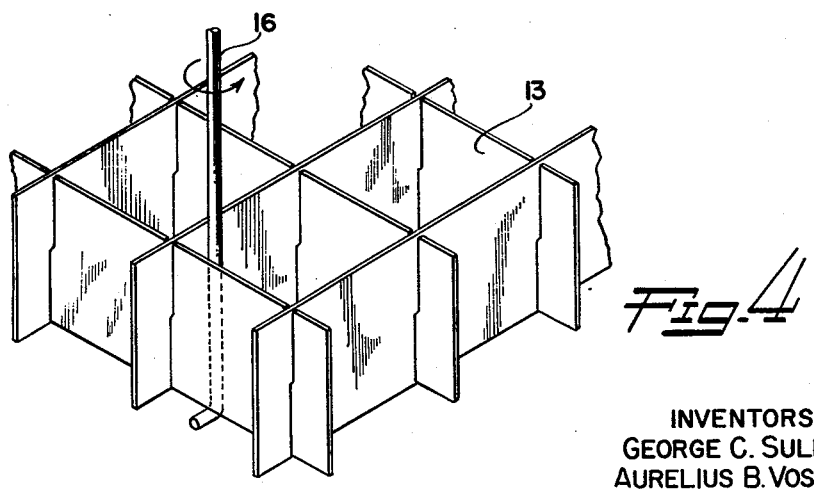

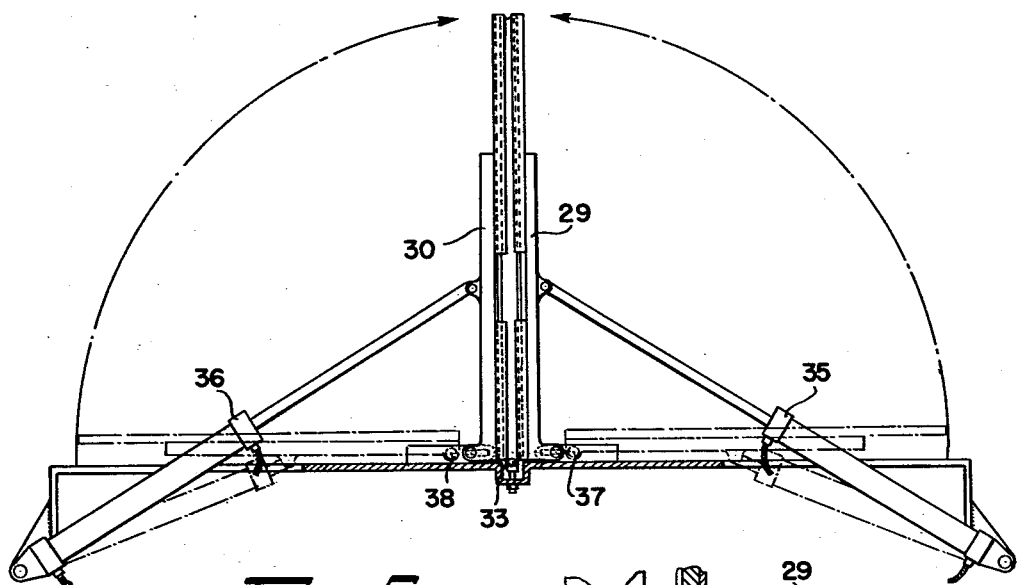
Fig. 6
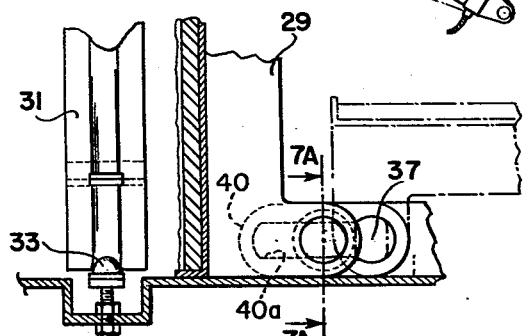
Fig. 7
Fig. 7A
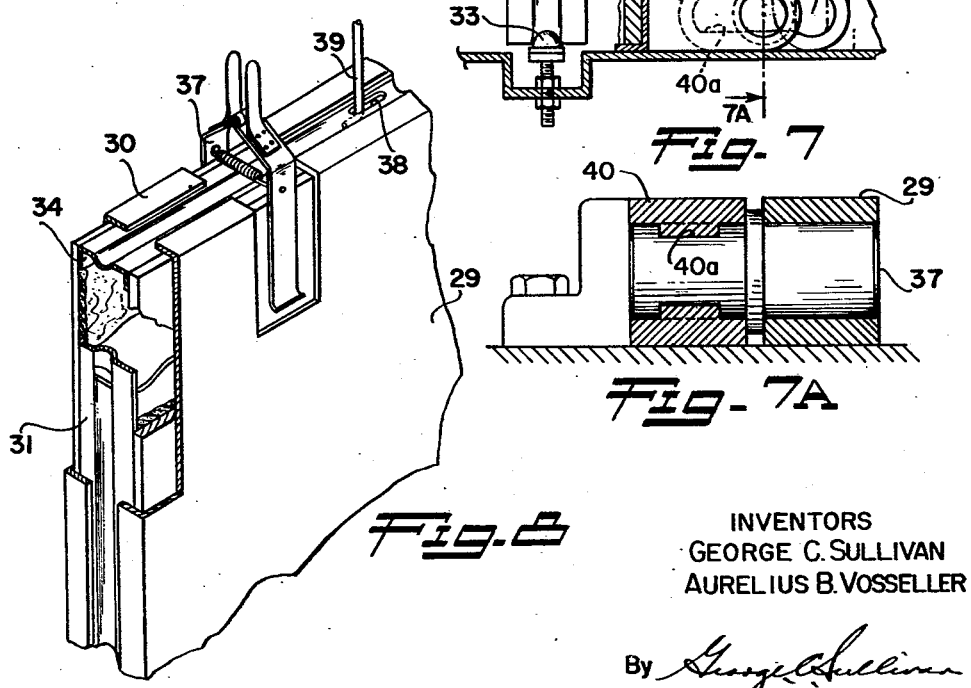
Fig. 8
INVENTORS
GEORGE C. SULLIVAN
AURELIUS B. VOSSELLER
By *George C. Sullivan*
Agent United States Patent Office 3,139,369
Patented June 30, 1964

3,139,369
APPARATUS FOR MAKING LAMINATED BUILD-
ING PANELS OF CELLULAR STRUCTURE
George C. Sullivan, Hollywood, Calif., and Aurelius B.
Vosseller, Paris, France, assignors to Lockheed Aircraft
Corporation, Burbank, Calif.
Filed Aug. 3, 1960, Ser. No. 47,173
2 Claims. (Cl. 156—563)

This invention relates to manufacture of laminated panels and more particularly to a simplified and inexpensive method and means for rapid assembly of building panels of the laminated type.

It is common practice in the construction of walls and partitions in so-called frame houses to utilize studs, braces, etc., with lath and plaster or the conventional plasterboard, or the like, as an interior finish. Exterior walls, such as various types of weather-proof sheathing, vapor barriers, and the like, or various combinations of the same and including an exterior finish of various materials. Insulation is usually separately applied, either by attachment between the studs or as a filler type insulation occupying the space between the interior and exterior surfaces.

The construction of such walls and partitions is inherently expensive and the materials utilized are heavy and bulky requiring massive beams, joists, foundations, etc. as load bearing members.

Recently prefabricated laminated panels have been developed and are gradually being accepted as building units. However, usage is still far from being widespread, primarily due to the expensive methods of fabrication currently in use. The panel components themselves, as exemplified herein, are relatively inexpensive, the cost per panel being proportional to the quality and type of surface materials used. For example, the panels fabricated by the present invention may utilize any of the conventional building materials such as sheet metal, wood, plywood, cement-asbestos board, plasterboard, etc.

Laminated panels as referred to herein generally are comprised of a pair of surface sheets of wood, metal, plywood plaster-board, cement-asbestos, and the like, and a core or spacer member of honeycomb, egg-crating, foamed glass, asbestos, calcium sheet materials or other spacer type configurations; the three elements being rigidly and firmly held in an integral unit by means of a cellular plastic adherent material.

Prior to the present invention it has been the practice to utilize slow setting glues or resins and manual assembly of the components which materially increase the time and labor costs involved. In addition, such glues or resins usually require high temperatures which necessitate heated platens to activate the same to produce the required adhesion and setting. However, development of a fast setting and inexpensive isocyanate or phenolic foaming resins, which react at room temperatures with very rapid rise times, has made possible new techniques in rapid and relatively inexpensive fabrication of such building units.

Accordingly, it is the primary object of this invention to provide new and inexpensive methods and means of fabrication of laminated panels.

Another object of the invention is to provide a simplified method of fabrication of laminated panels which materially speeds up production of the panels at a substantial reduction in cost.

A further object of this invention is to provide means and method for mass production of laminated panels.

These and other related objects will be apparent from the following detailed description and drawings in which:

FIGURE 1 is a perspective view of one embodiment of the invention;

FIGURE 2 is an end view of the frame 18 and associated mechanism of FIGURE 1;

FIGURE 3 is a detail view of the roller and suction cup of FIGURE 2;

FIGURE 4 is a detail view of the rotating rod 16 and spacer 13 of FIGURE 1;

FIGURE 5 is a perspective view of a second embodiment of the invention;

FIGURE 6 is an end view of the operating mechanism used for assembly of the panel generally shown in FIGURE 5;

FIGURE 7 and 7A are a detail of the operating hinge slot of FIGURE 6 for providing a combination of movements;

FIGURE 8 is a detail showing of an edge clamp arrangement, and illustrating details of the frame; and FIGURE 9 is a detail showing of a sealing arrangement between adjacent panels.

Referring now to FIGURE 1, a pair of surface sheets 1 and 2 are carried by an endless belt 3 or the like from a convenient storage area (not shown) to the point of assembly. The endless belt 3 passes a station generally designated as A where the cellular plastic is applied to the upper sides of the sheets 1 and 2. The sheets 1 and 2 are held on the belt 3 by means of the projecting dogs 4, and are moved at a constant speed relative to the station A, where the foaming cellular plastic 6 hereinafter to be described is applied. As illustrated in FIGURE 1, the station A comprises two sets of sprayers, one set for each sheet. Inasmuch as the foaming resin can be applied by spraying, brushing, blading, and the like, the particular details of the sprayer are not a part of this invention, and merely shown here for purposes of illustration.

As for example, the nozzle 5 may be one of the improved type wherein the resin and blowing agent are mixed at the exit orifice and in the event of stoppage of the spray, a back-up and reaction within the nozzle is eliminated, thereby avoiding excess time lost for cleaning and/or replacement of the nozzles. A line 7 supplies air pressure while lines 8 and 9 deliver the resin and blowing agents from sources (not shown) to the nozzles.

To provide intermittent spraying of the sheets 1 and 2, as the sheets are progressed by the endless belt, projecting lugs 10 contact a micro-switch 11 on the sprayer station to alternately start and stop the sprayers as the sheets pass beneath the sprayers. It is obvious that the timing of the spraying of the sheets 1 and 2 may be adjusted or delayed one with respect to the other as required for practical reasons and operation.

From the spraying station (or other cellular plastic applying means) the coated sheets progress to the assembly station, generally designated at B. As best seen in FIGURE 2 the two sheets 1 and 2 are at different levels at this point, sheet 1 lying below the plane of sheet 2. The spacing member 13 is conveyed from a nearby storage area by means of the tracks 14 and trolley 15. The spacer 13 is illustrated as conventional egg-crating or honeycomb material, but it is obvious that other type spacer elements can be used.

Trolley 15 is provided with a plurality of rotating rods 16 (FIGURE 4) which are provided with lugs at the lower end thereof. It is readily seen that by lowering the rod and lugs through the honeycomb or egg-crating and then rotating the rods, the lugs will be turned so as to underlie the edges of the honeycomb or egg-crating. The spacer is then lowered toward the coated sheet 1 and just before the spacer reaches the surface of the coated sheet the rods are rotated and drop the spacer onto the foaming resin coated surface.

The second sheet 2 which was advanced along with sheet 1 comes to rest on the movable frame 18, which is provided with a plurality of rollers 19 (FIGURE 3) and suction cups 20, or other holding or gripping means, and upstanding lugs 21 to assure register of the two sheets upon final assembly. While the egg-crating or honeycomb material is being lowered, vacuum is applied to the suction cups 20, and as soon as the trolley 15 has moved out of the way, the frame 18 is rotated through the arc, as illustrated by the large arrow of FIGURE 2, bringing the coated sheet 2 down upon the egg-crating or other spacing member. While a handle 41 and associated gearing is shown to provide the rotation and lowering of sheet 2, it is apparent that a hydraulically operated table can be used if desired. Continuing the rotation of the handle 41 after the second sheet 2 has made contact with the spacing member will apply sufficient pressure to the panel comprising the coated sheets 1 and 2 and the spacing means 13 to force the spacer into the adherent foamed coating to provide an intimate contact between the sheets and the corresponding sides of spacing member.

The adherent cellular plastic to be described hereinafter is particularly adapted to the present invention inasmuch as the reaction takes place quite rapidly and preferably at room temperatures. The foaming resins not only provide a strong and durable adhesive to act as a bonding agent but forms a layer of cellular material on the inside of the sheets 1 and 2 which provides good insulation quality to the assembled panel unit.

The assembled panel may preferably be clamped around the edges, after the frame 18 has been raised, by means of any standard clamps such as C clamps, or the like, and moved to a convenient area for final curing. Preferably the panels may be stacked on a pallet and placed in a curing room having a temperature of around 125° to 225° F. for eight or ten hours, more or less, to increase the physical properties of the cellular plastic coatings 6.

The layers or coatings 6 preferably cover the entire inner surface of the skins as assembled except, of course, where the internal reinforcing or spacing means 13 directly contacts the surfaces of the skins or sheets 1 and 2. The thickness of the layers 6 may be varied to adapt the building units or panels for different uses or applications. The layers 6 are formed of a low-density, high strength foamed or cellular plastic and may be of a cellular polyester plastic, a cellular polyether plastic, a cellular castor oil foamed plastic, or the like, which resins or resin mixtures may be applied to the surfaces of the skin sheets 1 and 2 by brushing, spraying, dipping, troweling, or the like. It is preferred, however, to employ either foamed phenolic resins or the reaction product of an alkyd resin-diisocyanate mixture which may or may not incorporate fillers, fire retardants, and the like, as the material of the layers 6. It is a feature of the invention that a relatively thin covering of such a reactant mixture is applied to the inner surface of each outer sheet 1 and 2 and then allowed to react or foam up at room pressure and temperature to embed and bond with the filler or spacer means 13 and to permanently adhere to the outer laminations.

The reactant alkyd resin-isocyanate mixture, of which the laminations or layers 6 may preferably be formed, may be varied considerably without departing from the invention but preferably comprises an alkyd resin wherein the hydroxyl and carboxyl groups in the alkyd resin reactants are in the ratio of from 3(OH):1(COOH) to 4(OH):5(COOH) and wherein the water content is from 0.1% to 2.5% by weight and where meta toluene diisocyanate is employed in the proportion of from 35 to 150 parts by weight to 100 parts by weight of the alkyd resin depending upon the quantity of water present in the alkyd resin component, the acid number of the resin component and the character and amount of other ingredients that may be incorporated in the reactant mixture. An alkyd resin employed in the reactant mixture for the layers 6 may be selected from the following formulae:

*Formula A*

| | Mols |
|---|---|
| Glycerol | 4 |
| Adipic acid | 2.5 |
| Phthalic anhydride | 0.5 |

*Formula B*

| | |
|---|---|
| Glycerol | 2 |
| 1,4 butylene glycol | 1 |
| Adipic acid | 2 |

*Formula C*

| | |
|---|---|
| Trimethylol propane | 4 |
| Adipic acid | 2.5 |
| Phthalic anhydride | 0.5 |

The alkyd resins of the above formulations and which are the reaction products of polyhydric alcohols and polybasic acids, modified or unmodified with oil and/or other resins, have an acid number of from 5 to 80 and have the above set forth range of hydroxyl groups to carboxyl groups in the reactants of the resins, and are entirely satisfactory, however, it is more preferred to employ alkyd resins having an acid number between approximately 10 and approximately 25 and wherein the ratio of the hydroxyl groups to the carboxyl groups is 2:1.

Low density cellular plastic laminations 6 of superior physical properties are obtainable by incorporating in the above described reactant mixture a relatively small proportion of one or more high molecular weight thermoplastic polymeric resins additives that are soluble in the meta toluene diisocyanate. Such resin additives may be selected from:

Ethyl cellulose
Polymeric chlorinated natural rubber
Benzyl cellulose
Polymeric vinyl chloride-vinyl acetate co-polymers
Natural rubber Approximately 2 grams of the polymeric thermoplastic resin additive may be used with each 100 grams of the meta toluene diisocyanate of the reactant mixture. Ethyl cellulose has been found to be particularly effective in improving the physical characteristics of the foamed cellular laminations 6 and the concentration of this additive resin may be between 0.03 gram and 15 grams for each 100 grams of the meta toluene diisocyanate. Commercial grades of the ethyl cellulose resins may be employed wherein the ethoxyl content is from 43% to 50%.

The following is a typical formula for preparing the reactant mixture for the layers 6:

*Formula I*

An alkyd resin prepared from 4 mols glycerol, 2.5 mols adipic acid and ½ mol phthalic anhydride and having an acid number of from 15 and a water content of about 0.03% by weight is mixed with meta toluene diisocyanate in the approximate proportion of 60 grams of the alkyd resin to 40 grams of the meta toluene diisocyanate.

Another typical formulation for the reactant mixture for the adherent insulating layers 6 is:

*Formula II*

An alkyd resin prepared from 4 mols trimethylol propane, 2.5 mols adipic acid and 0.5 mol phthalic anhydride is mixed with meta toluene diisocyanate containing 2 grams of ethyl cellulose of from 50 to 100 centipoises viscosity and having an ethoxyl content of from 45 to 49.5% for each 100 grams of the meta toluene diisocyanate, in the proportion of approximately 60 grams of the alkyd resin for each 40 grams of the meta toluene diisocyanate ethyl cellulose blend.

The above described reactant mixture is prepared by thoroughly mixing the meta toluene diisocyanate, the selected alkyd resin and, if desired, the polymeric resin additive and the resultant mixture, which is in a liquid state, is then applied to the inner surface of the outer sheets 1 and 2.

Another of the classes of reactant resin mixtures which may be employed in providing the relatively low density high strength adherent layers 6 are reactant or foaming flowable mixtures or compositions comprising an acid catalyzable water miscible phenolaldehyde resol, a gassing agent that liberates gas when reacted with an acid, and an aqueous-acid catalyst. Such reactant mixtures may be applied by spreaders or spatula, by dipping, spraying, brushing, pouring, and the like, and react at atmospheric pressure and room temperature to produce a strong foamed or cellular product that permanently adheres to the surfaces of practically all solid materials. The following are typical formulae for the phenolic resin reactant plastic foam-forming mixtures:

*Formula 1*

| | | |
|---|---|---|
| Water miscible phenol aldehyde resol | grams | 110 |
| 2,4,6-trimethylol 1 allyloxy benzene | do | 10 |
| Aluminum powder—422 mesh | do | ½ |
| Polyvinyl alcohol | do | 6 |
| Catalyst | do | 14 |

The catalyst may contain:

| | | |
|---|---|---|
| Benzene sulfonic acid (70% concentration) parts by weight | | 2.88 |
| Phosphoric acid (85% concentration) | do | 5.3 |
| Water | do | 2.82 |

*Formula 2*

| | | |
|---|---|---|
| Water miscible phenol aldehyde resol | grams | 1200 |
| Aluminum powder (atomized) | do | 5 |
| Catalyst (above described) | do | 250 |

The resol or phenolic resin of such mixtures may be prepared from:

| | | |
|---|---|---|
| Phenol | mol | 1 |
| A 35% to 37% by weight aqueous formaldehyde solution | mols | 1 to 2½ |
| Barium hydroxy 8H₂O | do | .003 to 0.020 |

To prepare the reactant phenolic resin mixtures the resin, the aluminum powder and the 2,4,6 trimethylol 1 allyloxy benzene (when used) are mixed together to form one "package" and the ingredients of the catalyst are mixed together to form a second "package." These two packages are then mixed together to form a liquid or semi-liquid reactant mixture which may be readily poured, bladed, sprayed, brushed, etc. The resultant foamed resin product is less expensive than alkyd resin-isocyanate type products and, therefore, may be preferred in many commercial applications.

When the reactant mixture, for example phenolic resin or alkyd resin-isocyanate mixture, reacts, it comes into direct and intimate contact with the individual strips of the spacer means 13, or the like, and rises up around the filler or spacer means to enclose or embed the same and to accurately conform with their surfaces. When the mixture reacts, multitudes of relatively small substantially uniform and thoroughly distributed internal gas cells are formed, these cells remaining when the layers 6 set and harden. The reactant mixture foams up to the extent that after setting and curing it has a volume many times its original volume.

Referring now to FIGURE 5, a second embodiment of the invention is illustrated. A pair of surface sheets 21 and 22 progress along the two endless belts 23 and 24 from a convenient storage area (not shown). Lugs 23', 24' maintain the separate sheets in aligned relation on the belts. As the sheets pass station C, streams of the liquid cellular plastic pour onto the sheets 21 and 22 and are smoothed into relatively thin films 25 and 26 by means of the blade 27. The flow of the foaming mixture may be continuously controlled by the lever 28 in a known manner, or if more sophisticated control is desired such may be employed without departing from the spirit of the invention.

The now coated sheets 21 and 22 progress along the belts and finally drop into the pressure platens, which have a raised lip extending partially around the edge thereof to maintain the separate sheets in alignment and thereby assure proper assembly of the completed panel. The resin coatings are now reacting and rising on the skins or sheets 21 and 22, and adhering to the surfaces thereof.

From a convenient nearby storage area a spacer element 31 is brought by means of the overhead track 32 into the assembly station D and comes to rest on ball bearings 33 shown in FIGURE 7, set in a channel below the floor of the assembly table. It will be noted that the spacer frame (see FIGURE 8) preferably is comprised of a channel member 34 which has an arcuate stiffening surface along the edge, which coincides with the ball bearing and provides an inexpensive means for centering and holding the spacer element during assembly. The frame member may also constitute an integral part of the completed panel and provide ready means for edge attachment of a plurality of panels, along with a seal 40 as shown in FIGURE 9.

Once the spacer member 31 has come to rest at station D, hydraulic cylinders 35 and 36 are operated, thereby raising the pressure platens 29 and 30 about the pivot points 37 and 38. As best shown in FIGURES 7 and 7A a slotted member 40 having a slot 40a therein is located on the table adjacent the lower edge of each of the pressure platens 29 and 30, and cooperates with the pivot point to permit a rotational movement about the pivot point until the platen is vertical and parallel to the spacer member 31 and then a horizontal movement directly toward the spacer element. Additional positive pressure is applied to the platens to bring the surface skins into intimate and bonding relation to the spacer element, and causing the foaming resin to rise up around the edges of the spacer elements thereby assuring a strong and uniform adhesive bonding over the entirely engaging contact of the individual corrugated elements of spacer 31 with both skins 21 and 22.

While the unit is held between the pressure platens, suitable clamps 37 as shown in FIGURE 8 may be applied to the assembled panel through the cutouts in the pressure platen provided for this purpose. After the clamps have been applied around the edges of the assembled unit, the pressure platens are released, returning to their original position and are ready to receive the next pair of panels which are passing beneath station C. The assembled unit is now moved by means of the overhead track to a nearby curing room, as before. Slots 38 in the panel frame provide a convenient means for attaching a hook 39 carried by the overhead track, as shown in FIGURE 8.

It is understood that either station A or station B of FIGURE 1 may be interchanged with station C or station D of FIGURE 5. Furthermore, if desired, it is readily apparent that the reacant resin mixture may be poured and bladed manually at either station A or C and assembled as described at either station B or D, or alternatively may be manually assembled at either station B or D and sprayed or bladed as described at station A or C and still fall within the scope of the invention. However, it is preferred that both stations A and B or C and D or any desired combination be utilized together to provide a lower cost and more uniform assembly of building panels.

While specific embodiments of the invention have been shown and described it should be understood that certain alterations, modifications and substitutions may be made to the instant disclosure without departing from

We claim:
1. Apparatus for rapid fabrication of laminated building panels having surface sheets of a desired material and finish suitable for the particular use to which the assembled panel is to be applied and spacer elements bonded between the sheets comprising, in combination, means for moving a pair of surface sheets in spaced apart relationship past at least one station, a first station, means at said first station for applying a coating of a foamable adherent cellular plastic to the upper side of each of said sheets, said first named means continuing the motion of said sheets so coated to a second station, the second station including platens having means for maintaining the spaced sheets in proper alignment, means for delivering spacer elements vertically suspended between the spaced sheets and means for raising the platens pivotally about the adjacent edges thereof to bring the sheets into physical contact with the vertically suspended spacer element and for applying pressure to the assembled panel.

2. The apparatus as defined in claim 1, wherein said delivery means including means to provide further delivery from the second station.

References Cited in the file of this patent

UNITED STATES PATENTS

| | | |
|---|---|---|
| 2,744,042 | Pace | May 1, 1956 |
| 2,862,254 | Meek | Dec. 2, 1958 |

FOREIGN PATENTS

| | | |
|---|---|---|
| 213,242 | Australia | July 25, 1957 |
| 577,790 | Great Britain | May 31, 1946 |
| 649,345 | Great Britain | Jan. 24, 1951 |
| 723,621 | Great Britain | Feb. 9, 1955 |
| 137,652 | Sweden | Oct. 14, 1952 |